US006903474B2

(12) United States Patent
An

(10) Patent No.: US 6,903,474 B2
(45) Date of Patent: Jun. 7, 2005

(54) ELECTRO-MECHANICAL TRANSDUCER

(75) Inventor: Chi-Yup An, Seongnam (KR)

(73) Assignee: Twin Saver Co. Ltd., Goyang-Si (KR)

( * ) Notice: Subject to any disclaimer, the term of this patent is extended or adjusted under 35 U.S.C. 154(b) by 0 days.

(21) Appl. No.: 10/477,911

(22) PCT Filed: Mar. 25, 2002

(86) PCT No.: PCT/KR02/00502

§ 371 (c)(1), (2), (4) Date: Nov. 15, 2003

(87) PCT Pub. No.: WO02/093975

PCT Pub. Date: Nov. 21, 2002

(65) Prior Publication Data

US 2004/0145258 A1 Jul. 29, 2004

(30) Foreign Application Priority Data

May 17, 2001 (KR) ................................ 10-2001/0026924

(51) Int. Cl.$^{7}$ .................................................. H02K 7/06
(52) U.S. Cl. ............................................ 310/81; 310/15
(58) Field of Search .......................... 310/12–15, 20–24, 310/27, 30, 34, 81

(56) References Cited

U.S. PATENT DOCUMENTS 2,566,850 A * 9/1951 Mott .......................... 381/419
3,312,841 A * 4/1967 Makino ....................... 310/15
3,500,080 A * 3/1970 Bey ............................ 310/29
3,651,283 A * 3/1972 Doschek ...................... 381/419
4,015,227 A * 3/1977 Riko et al. .................. 335/231
4,901,357 A * 2/1990 Albright ..................... 381/400
5,144,176 A * 9/1992 Popper ........................ 310/81
5,444,313 A * 8/1995 Oudet ......................... 310/17
6,217,508 B1 * 4/2001 Ball et al. ...................... 600/25
6,236,125 B1 * 5/2001 Oudet et al. .................. 310/12
6,262,500 B1 * 7/2001 Wakiwaka et al. ............ 310/15
6,751,334 B2 * 6/2004 Hakansson .................. 381/396

* cited by examiner

*Primary Examiner*—Dang Le
(74) *Attorney, Agent, or Firm*—G W i P S

(57) ABSTRACT

An apparatus adopting an iron core and an inertial mass is disclosed for exerting high power output by converting a sound signal to vibration so as to stimulate the human hearing organs through the bones. A sound-to-vibration conversion apparatus comprises a housing, a permanent magnet having an N-pole and an S-pole, only one pole of which is fixed to the housing, an electromagnet movably installed into the housing faced either the S-pole or N-pole of the permanent magnet, whichever one is not fixed to the housing, and an inertial mass for amplifying the inertial force of reciprocating movement of the electromagnet, so that the housing with the permanent magnet can be vibrated by the electromagnet, whereby the electromagnet vibrates in a reciprocating fashion towards or away from the permanent magnet in accordance with the incubation between the polarity formed at the electromagnet by acoustic signal applied to the electromagnet and either the N-pole or the S-pole of the permanent magnet.

3 Claims, 2 Drawing Sheets

ELECTRO-MECHANICAL TRANSDUCER

BACKGROUND OF THE INVENTION

1. Field of the Invention

The present invention relates to an apparatus for converting a sound signal into vibration so as to stimulate the human hearing organs through the bones. More particularly, it has adopted an iron core and an inertial mass in order to achieve high power output.

2. Related Prior Art

Conventionally, a bone-conducting loudspeaker has been developed for persons who have difficulty hearing. This loudspeaker is a kind of acoustic transducer that enables an auditorily handicapped person who does not have the tympanic membrane to hear by stimulating the auditory nerves through the cranial bone instead of the tympanic membrane. Basically, the bone-conducting loudspeaker produces sound through the medium of liquid or solid matter, such as the human body, while the conventional loudspeaker uses the atmosphere.

FIG. 1 is a structural diagram roughly showing the conventional acoustic loudspeaker. As shown, a permanent magnet 3 is fixed to a conical frame 1. One pole of the magnet 3 is inserted in a cylindrical electromagnet 7 around which a voice coil 5 is wound and which has a closed face. To the closed face of the electromagnet 7, a conical vibrating diagram 9 is attached. This diaphragm 9 vibrates back and forth (in the direction of Y in FIG. 1) along with the electromagnet 7. More specifically speaking, when an acoustic signal V is applied to the voice coil 5, the coil 5 produces magnetic force. The magnetic force interacts with the magnet 3 to move the electromagnet 7. Thereby the diaphragm 9 vibrates and regenerates acoustic sound by generating pressure waves in the surrounding atmosphere.

Meanwhile, in order to expand the functionality of hearing aids for auditorily handicapped persons, a "body-sensible loudspeaker" has been developed, by which a user can sense the acoustic energy generated from an audio system through the tactile organs rather than the auditory organs. The body-sensible loudspeaker, which converts the acoustic signal into vibration to stimulate the human body, provides even more vivid sound in comparison with the conventional acoustic loudspeaker. It can be used for vehicle seats, game devices, theatre seats, etc.

However, in the conventional body-sensible loudspeaker, high power output cannot be obtained because it directly uses the same structure as the conventional acoustic loudspeaker (see FIG. 1). In the conventional acoustic loudspeaker, the vibrating diaphragm is made of a soft material, such as paper or PVC. Thus, it has a disadvantage that:

The service life of the coil is limited by the heat generated by the electric current, which must be increased when the output power is made higher. Moreover, if the fundamental oscillation frequency of the vibrating diaphragm coincides with the frequency of the amplified acoustic signal, the diaphragm may resonate. This will cause the diaphragm to abnormally oscillate, blocking the response over a certain frequency range.

SUMMARY OF THE INVENTION

To overcome the above disadvantages in conventional body-sensible loudspeaker, it is an object of the present invention to provide a redesigned loudspeaker for increasing vibration energy by using an electromagnet having an iron core and an inertial mass.

To achieve the above object, there is provided a sound-to-vibration conversion apparatus comprising a housing; a magnet means having an N-pole and an S-pole, only one of which is fixed to the housing; and an electromagnet movably fixed to the housing so as to face whichever pole of the magnet means (N or S) that is not fixed to the housing, whereby the electromagnet reciprocates in such a way to get close to or away from the magnet means in accordance with the interaction between the polarity formed at the electromagnet by the acoustic signal applied to the electromagnet and either the N-pole or S-pole of the magnet means.

In the above, the electromagnet includes an E-shaped iron core having three protrusions and a coil wound around the central protrusion.

It is desirable that the electromagnet comprises an inertial mass for increasing the inertial force of the electromagnet's reciprocal motion, such that the housing including the magnet means can vibrate against the electromagnet. It is also desirable that the magnet means is a permanent magnet. And it is also desirable that the apparatus according to this invention further comprises an elastic means for giving the electromagnet a force resisting the electromagnet's motion, and a spacer for keeping the electromagnet apart from the permanent magnet event when the electromagnet approaches nearest to the magnet means.

BRIEF DESCRIPTION OF THE DRAWINGS

The above and other objects, features and advantages of the present invention will became more apparent from the following description in conjunction with the accompanying drawings, in which.

DETAIL DESCRIPTION OF THE PREFERRED EMBODIMENT

The present embodiment will be described below with reference to the accompanying drawings.

Figure 1:
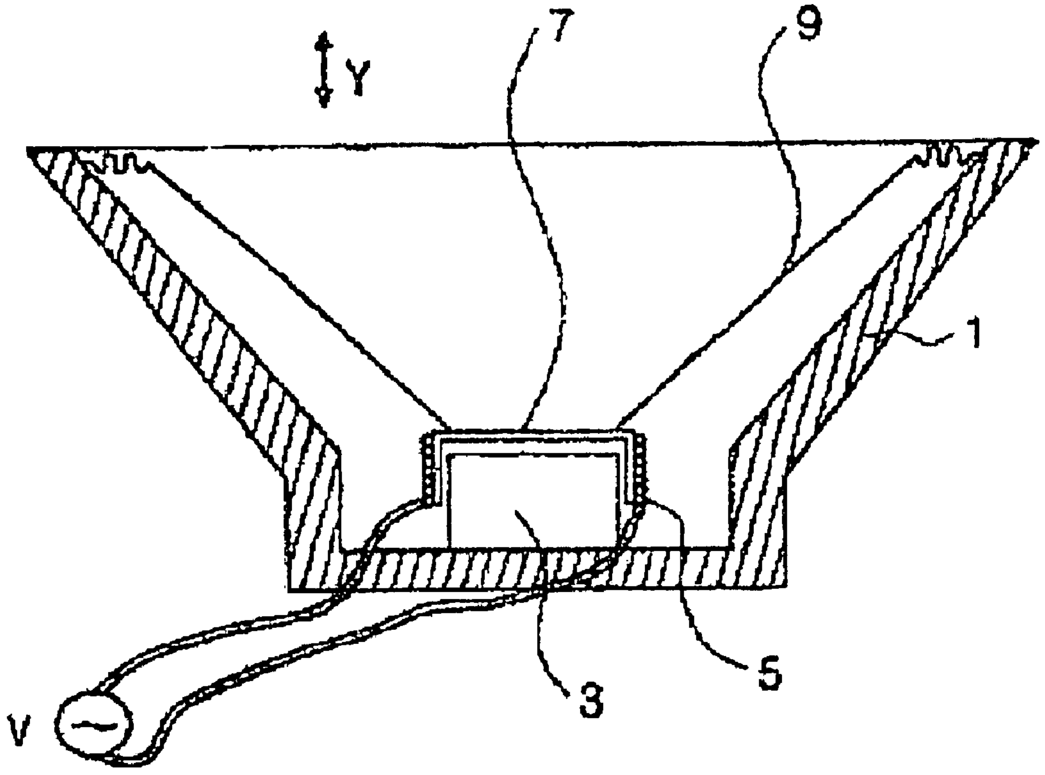
Fig. 1 (Prior Art)
FIG. 1 is a structural diagram roughly showing the conventional acoustic loudspeaker.
Figure 2:
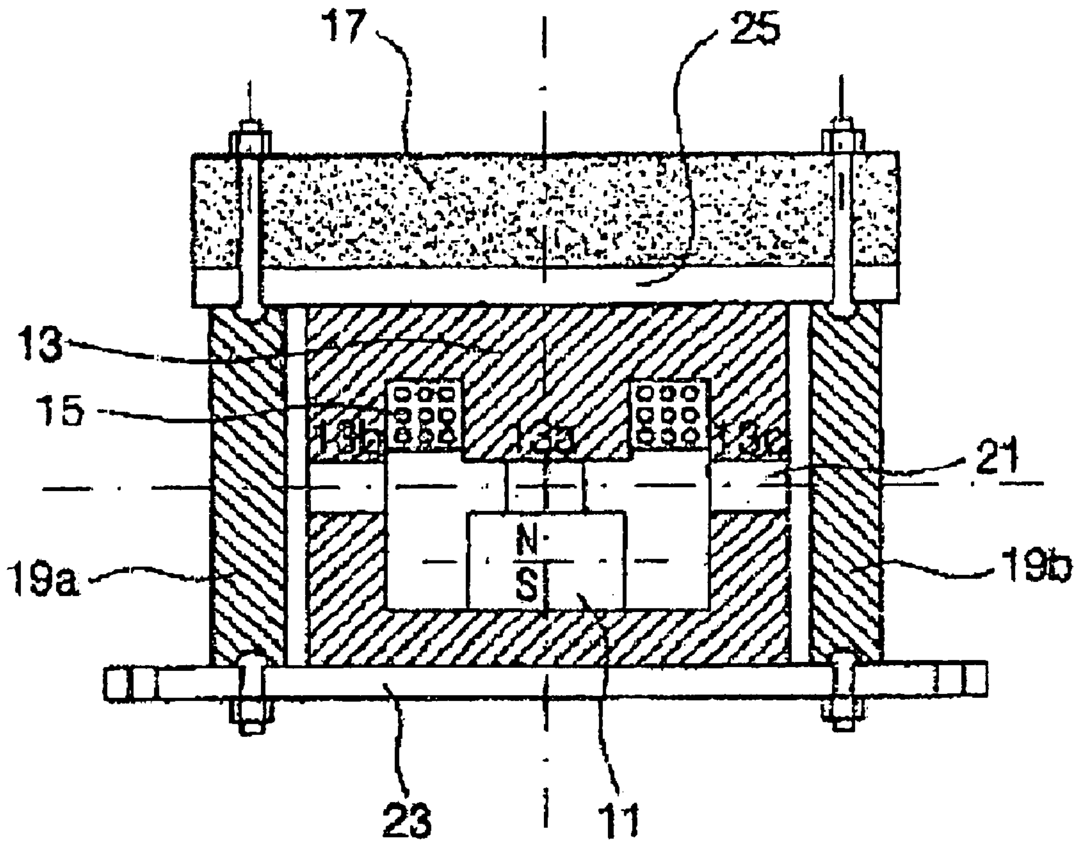
FIG. 2 is a cross-sectional view showing a preferred embodiment for carrying out the present invention.

FIG. 2 is a cross-sectional view showing the preferred embodiment of the present invention. A sound-to-vibration conversion apparatus according to the present invention is roughly composed of a magnet means 11 having an N-pole and an S-pole and being fixed to a housing 23, and an electromagnet 13 arranged to face the N-pole or S-pole of the magnet means 11 and movably fixed to the housing 23. (Even though FIG. 2 shows that the electromagnet 13 faces the N-pole of the magnet means 11, the invention is not limited to this configuration.)

The housing 23 may be a car seat, a bed, a chair, or any other item to which this apparatus could be adapted. Even though the magnet means 11 can include either a permanent magnet or an electromagnet, in this description a permanent magnet will be typically referred to for convenience.

As shown in FIG. 2, the electromagnet 13 includes an E-shaped iron core having three protrusions 13*a, b,* and *c* and a coil 15 would around the central protrusion 13*a*. To the coil 15, alternating current (acoustic signal from an audio system) is applied.

From the above configuration, it can be noted that the electromagnet 13 reciprocates in such a way to get close to or away from the magnet means 11, in accordance with the interaction between the polarities formed at the electromagnet 13 by the acoustic signal applied to the coil 15 and the polarity of the magnet means 11. That is to say, when an acoustic signal is applied to the coil 15, the polarity and the magnetic force of the electromagnet 13 varies according to the applied acoustic signal's amplitude or phase. Thereby, the attractive force and repulsive force between the electromagnet 13 and the permanent magnet 11 causes the electromagnet 13 to reciprocate. Here, the reciprocating distance of the electromagnet 13 traces a waveform of the applied acoustic signals.

From the foregoing, a sound-to-vibration conversion apparatus of the present invention utilizes magnetic force to convert sound into vibration, like the conventional acoustic loudspeaker. Therefore, it is necessary to adapt a magnet and a coil to this invention also. However, unlike the conventional body-sensible loudspeaker, this invention employs and iron-cored electromagnet 13 in which a coil is wound around an iron core. Because the iron-coated electromagnet 13 is relatively heavy, it acts as an inertial against the fixed magnet 11, so that the interaction between the fixed magnet 11 and the electromagnet 13 can produce much more vivid vibration. Additionally, because an iron-cored electromagnet 13 provides higher efficiency than a non-iron-cored electromagnet, the loss of magnetic force is minimized in this invention.

Meanwhile, the electromagnet 13 includes an inertial mass 17 to increase the inertial force of the electromagnet's reciprocal motion. Therefore, even though the electromagnet 13 is movably fixed to the housing 23, because the electromagnet 13 including the inertial mass 17 is heavier than housing 23, the housing 23 including the permanent magnet 11 will vibrate instead of the electromagnet 13. Accordingly, the vibration energy of a sound-to-vibration conversion apparatus of the present invention can be augmented.

When the housing 23 vibrates, this vibration energy is transferred to the seat, bed, chair, etc. (not shown) to which the housing 23 is attached, and finally the vibration energy will be transmitted to stimulate the human tactile organs.

Returning to FIG. 2, the reference numeral "19*a*" and "19*b*" denote elastic members for giving the electromagnet a resistive force in the direction opposite to the electromagnet's motion. The reference numeral "21" denotes a spacer for keeping the electromagnet 13 apart from the permanent magnet 11 and for absorbing the impact shock when the housing 23 including the permanent magnet 11 collides with the electromagnet 13.

As described above, when the housing 23 vibrates or collides with the electromagnet 13, a user can sense the strong vibration from this apparatus. This invention provides a user with a strong and vivid explosive sound and explosive vibration when used in a computer program game station or a theater seal.

In the mean time, it is desirable to include a frequency trap in an amplifier for providing an acoustic signal to the apparatus of this invention, because the electromagnet may abnormally oscillate in response to a particular frequency. A frequency trap for this purpose is well known to an ordinary person who is skilled in the art to which this invention pertains.

Unexplained element "25" denotes a frame for supporting the electromagnet 13, the elastic members 19*a* and *b*, and the inertial mass 17, which is separated from the housing 23 on which the permanent magnet 11 is fixed and that is attached to the seat or the chair, etc.

From the foregoing the sound-to-vibration conversion apparatus according to the present invention has an advantage of providing high power vibration energy with lower heat consumption loss. Moreover, its simple structure makes it possible to improve the productivity at low cost. This apparatus can be used in vehicle seats to satisfy desires of audiophiles. If it is used for a computer, a game machine, a theater chain, a floor, a ceiling, a wall etc., a user can enjoy vivid and intense sound as if he were on the spot. If it is used for a mattress or bed, it is helpful for the antenatal training of pregnant women, curing insomnia, and promoting a dramatic married life.

If the sound-to-vibration conversion apparatus for the present invention is adapted to the keyboards of an electronic piano, since fingers can feel the vibration through the keyboards, even auditorily handicapped persons can play the piano as they are feeling the tones. This invention may be applied to an acoustic resonator apparatus. That is, this invention can reduce vehicle or toilet noise, and, if attached to a conference room wall or window, eavesdropping can be prevented. In addition, this invention is applicable to communication means using the medium of liquid or solid, and to a massage treatment machine.

While the invention has been shown and described with reference to a certain embodiment to carry out this invention, it will be understood by those skilled in the art that various changes in form and details may be made therein without departing from the spirit and scope of the invention as defined by the appended claims.

What is claimed is:

1. An electro-mechanical transducer for providing high power vibration comprises:

a housing (23) for mounting on a desired place, a magnet means (11) having an N-pole and an S-pole, only one pole of which is fixed to said housing (23), an electromagnet (13) movably installed into said housing so as to face either the S-pole or the N-pole of said magnet means (11), whichever one is not fixed to said housing (23), an inertial mass (17) for amplifying inertial force of reciprocating movement of said electromagnet (13), so that said housing (23) including the magnet means (11) can be vibrated by said electromagnet (13), part of elastic members (19*a*, 19*b*) for laterally retaining said electromagnet (13), so that a resisting force is exerted on said electromagnet (13) in the direction opposite to its motion, a frame (25) disposed underneath said inertial mass (17) and supported by the pair of elastic member (19*a*, 19*b*) for retaining said electromagnet (13), and a pair of spaces (21) disposed between said magnet means (11) and said electromagnet (13) for maintaining a separation between the two components when the electromagnet (13) approaches the magnet means (11), whereby said electromagnet (13) vibrates in a reciprocating fashion towards or away from the magnet means (11) in accordance with the interaction between the polarity formed at the electromagnet (13) by acoustic signal applied to the electromagnet (13) and either the N-pole or the S-pole of the magnet means (11).

2. A transducer according to claim 1, wherein said magnet means (11) is a permanent magnet.

3. A transducer according to claim 1, wherein said electromagnet (13) forms an E-shaped iron core having three protrusions with a coil winding around a central protrusion.

* * * * *